United States Patent [19]

Cary et al.

[11] Patent Number: 4,827,771

[45] Date of Patent: May 9, 1989

[54] TRANSDUCER ASSEMBLAGE FOR HAND-HELD VIBRATION METERS

[75] Inventors: Andrew S. Cary, Columbus; Carl A. Rutter, Worthington, both of Ohio

[73] Assignee: IRD Mechanalysis, Inc., Columbus, Ohio

[21] Appl. No.: 172,293

[22] Filed: Mar. 23, 1988

[51] Int. Cl.[4] .......................................... G01N 29/04
[52] U.S. Cl. ......................................... 73/644; 73/661
[58] Field of Search ................. 73/496, 652, 654, 644, 73/649, 660, 661, 862.59; 310/328, 329, 338

[56] References Cited

U.S. PATENT DOCUMENTS

| | | | |
|---|---|---|---|
| 1,702,456 | 2/1929 | Trumpler | 73/652 |
| 2,849,629 | 8/1958 | Kissinger | 310/329 |
| 3,027,758 | 6/1958 | Kirsten et al. | 73/661 |
| 3,081,622 | 3/1963 | Intraub et al. | 73/658 |
| 3,145,311 | 8/1964 | Dickey | 310/329 |
| 3,498,114 | 3/1970 | Garber et al. | 73/649 |
| 3,847,015 | 11/1974 | Blatter | 73/649 |
| 4,038,866 | 8/1977 | Johnson | 73/654 |

Primary Examiner—Stewart J. Levy
Assistant Examiner—Louis M. Arana
Attorney, Agent, or Firm—Mueller and Smith

[57] ABSTRACT

A probe assemblage for vibration meters of the hand-held variety which exhibits a substantially flat frequency response through 1,000 Hz. The probe structure includes a flat contact surface at its tip for hand-held engagement with the vibratory surface being monitored. The tip is spaced from an articulated ball and socket-like joint which provides for vibration transfer to an associated transducer such as an accelerometer. A compliant material such as Teflon or the like may be positioned intermediate the curved vibration transfer and receiving surfaces of the articulated joint within the probe.

21 Claims, 5 Drawing Sheets

TRANSDUCER ASSEMBLAGE FOR HAND-HELD VIBRATION METERS

BACKGROUND OF THE INVENTION

Techniques for preventive or predictive maintenance of machinery based upon the evaluation of vibration have been employed by industry for a considerable period of time. Various approaches to machinery vibration monitoring are utilized, ranging from the use of compact, hand-held meters to relatively complex, systems which function to continuously monitor vibration parameter transducers which are permanently mounted upon machinery. Typically, the latter monitoring systems carry out computer based analysis of transducer derived data. Such analytic functions will include trend analysis for predicting machine breakdown, the carrying out of threshold related comparisons for generating warnings and like operations. These detailed systems are described, for example, in U.S. Pat. Nos. Re. 31,750 and 4,399,513.

Over the relatively recent past, somewhat sophisticated computer driven hand-held data collectors have been introduced. As described in U.S. Pat. No. 4,612,620, these hand-carried devices are configured to be operatively coupled with a machine vibration monitoring transducer or pick-up which, as in the case of hand-held vibration meters, is positioned and retained by hand at a machine location intended for monitoring. All data derived from the transducer, as well as other meaningful information are automatically collected within the device retained local memory. Later, at convenient times, host-based computer analysis may be carried out with respect to the memory retained data.

Pick-ups or transducers which are employed with the above vibration responsive devices or systems generally are structured to evaluate those characteristics of vibration which are characterized as displacement, velocity and acceleration. Vibration velocity data long has been selected by industry as a direct measure of vibration severity and represents the more popular of parameters elected for vibration evaluation. Displacement measurements have found considerable application, for example, in evaluating stress at low frequencies in machinery. Vibration acceleration measurements are employed to evaluate vibrating forces applied to machines under investigation. Accelerometer type transducers are the more recent of those introduced and, depending upon the type mount employed, exhibit desirably flat response characteristics over extended frequency ranges. Further, these devices are somewhat conveniently, compactly structured, employing a known mass with a piezoelectric crystal to develop charge values reflecting characteristics of force and mass from which acceleration signals may be developed. While the flat frequency response characteristics of accelerometers are somewhat extensive where the devices can be permanently and rigidly mounted to the vibratory surface being evaluated, acceptably flat response ranges have been found to be substantially limited where hand-held devices are employed. In general, these hand-held accelerometer pick-ups are structured so as to respond to transmission of vibration through a probe which the operator holds in pre-designated orientations against the vibrational surface to be monitored. A desirable flat frequency response for such application would reach, for example, 1,000 Hertz to achieve relatively wider range applications for such implements. However, to the present, such responses have not been available from transducer structures where they are associated with hand-held probes.

SUMMARY

The present invention is directed to an improved vibration monitoring probe, hand-held vibration meter employing such probe, and an accelerometer assembly utilizing the probe structure which achieves important improvements in response characteristics. With the assemblage, a substantially flat frequency response characteristic is achieved for hand-held vibration monitoring devices extending substantially to about 1,000 Hz. In general, the probe structure is one utilizing a flat contact surface which is manually urged into abutting contact with the vibratory surface to be evaluated. This contact remains properly aligned to assure avoidance of localized resonances which may otherwise be developed through the use of an articulated assembly within the probe structure. The articulated assembly is configured in the manner of a ball and socket joint and further incorporates a thin compliant layer, enhancing the surface-to-surface vibration transfer characteristic of the articulated structure. Substantially accurate readings may be obtained by an operator employing the probe assembly even though the probe axis extending to conversion components of the transducer associated therewith is not retained in perfect perpendicularity to the vibratory surface being evaluated. In effect, the probe develops a cosine value of the angle of deviation from perpendicular, a value which permits collecting of data of value very close to that achieved with perfect perpendicularity of orientation.

Another particular aspect of the invention is the provision of a new and improved probe which is employed with a hand-held vibration sensor of a variety in which a sampling probe is manually positioned against a vibratory surface for effecting the transmission of vibratory phenomena, which phenomena are associated with the surface, to transducer conversion components from along a given axis for deriving select vibration parameter signals corresponding therewith. The improved probe includes a probe vibration transfer rod having one end connectable with the conversion components and extending along the given axis to a curved vibration receiving surface. The improved probe further includes a probe tip having a substantially flat contact surface for manually positioning in abutting engagement with the vibratory surface and a rounded vibration transfer surface spaced therefrom conforming with and intimately contacting the vibration receiving surface over a substantial surface area in slideably movable nesting relationship for transferring vibration phenomena experienced at the vibratory surface to the probe vibration transfer rod without substantial generation of localized resonances between the contact surface and the vibratory surface.

Another particular aspect of the invention provides a hand-held meter for evaluating the vibration of a vibratory surface which includes a hand-held housing; a transducer arrangement mounted within the housing and including conversion components responsive to vibration applied thereto along a given axis for deriving vibration signals corresponding therewith. A probe vibration transfer rod assemblage is aligned with the given axis and extends from the housing to an end located externally of the housing for applying vibration to the transducer conversion component. A shock mounting of the vibration transfer rod is provided by a mount which is formed of an elastomeric damping material and which serves to damp vibrations otherwise asserted from the rod to the housing. A curved vibration receiving surface is located at the probe vibration transfer rod end and a probe tip is provided having a substantially flat contact surface for positioning in abutting contact with the vibratory surface and further includes a curved vibration transfer surface spaced therefrom conforming with and intimately contacting the vibration receiving surface over a substantial surface area in slideably movable nesting relationship for transferring vibration experienced at the vibration surface to the probe vibration transfer rod. A signal treatment arrangement is provided within the housing which responds to the vibration signals for deriving vibration parameter signals and a readout is mounted upon the housing which is responsive to the vibration parameter signal for providing an acceptable readout corresponding therewith.

Still another particular aspect of the invention provides an accelerometer assembly for evaluating vibration characteristics of a vibratory surface which includes a housing, an accelerometer mounted within the housing having a conversion arrangement including a predetermined mass and a piezoelectric crystal coupled for response to the vibration applied along the given axis for deriving vibration signals corresponding therewith. A vibration transfer rod aligned with the axis is connected with the conversion arrangement and extends from the housing to an end for applying vibration to the accelerometer conversion components. Means defining a curved vibration receiving surface are located at the vibration transfer rod end and a probe tip is provided having a substantially flat contact surface for manually positioning in abutting contact with the vibratory surface and further includes a curved vibration transfer surface spaced from the contact surface which conformed with and is intimately contacting the vibration receiving surface over a substantial surface area in slideably movable nesting relationship for transferring vibration experienced at the vibratory surface to the vibration transfer rod.

Other objects and features of the invention will, in part, be obvious and will, in part, appear hereinafter.

The invention, accordingly, comprises the apparatus possessing the construction, combination of elements and arrangement of parts which are exemplified in the following detailed disclosure.

For a fuller understanding of the nature and objects of the invention, reference should be had to the following detailed description taken in connection with the accompanying drawings.

DETAILED DESCRIPTION OF THE INVENTION

Figure 1:
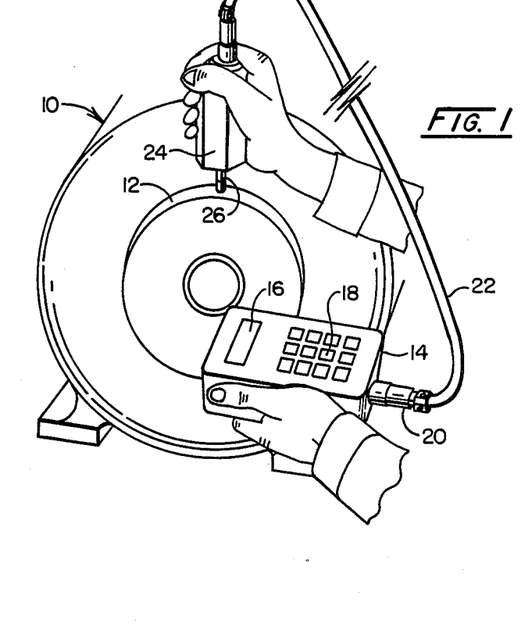
FIG. 1 is a partial perspective view of a data collector and meter for carrying out vibration monitoring of machinery employing a hand-held accelerometer assembly according to the invention.

Referring to FIG. 1, a machine 10 is revealed having a bearing housing 12 serving to support any of a variety of moving parts. Such machines as at 10 will exhibit vibration characterized signatures which will vary from time to time in dependence upon the operational condition of the components making it up. By periodically monitoring these vibration characteristics, predictive or preventive maintenance procedures can be instituted to minimize down time intervals for such machines and enhance their cost effectiveness. The figure reveals a data collector in somewhat schematic fashion at 14 having a readout, for example, provided as an LCD display at 16, a keyboard 18 for inputting manual data, operating program prompts and the like. Extending from a coupling 20 in the collector 14 is a cable 22 leading to a hand-held transducer 24 which, for example, may be provided as an accelerometer, velocity transducer, or the like. Vibrations from the bearing housing 12 are detected and, in effect, measured by this hand-held device 24 through the expedient of holding a probe 26 extending therefrom in a predetermined orientation, for example vertical or horizontal, against a pre-designated location upon machine 10. Generally, it has been found that this hand-held technique for employing transducer 24 as opposed to permanent mounting has led to restrictions in the available flat response or output of the device. Looking to FIG. 2, one conventional prior art probe structure is revealed at 28 having a base end 30 which is stud mounted into devices such as accelerometer 24 and exhibits a rounded contacting tip 32 configured, for example, having a 1½ inch radius.

Figure 2:
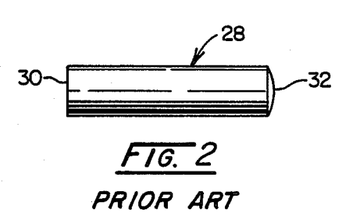
FIG. 2 is a side view of a probe employed in the prior art.
Figure 3:
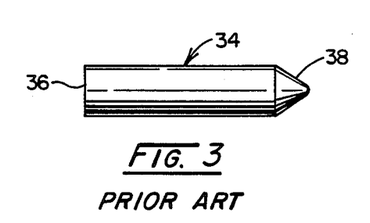
FIG. 3 is a side view of another type probe employed in the prior art.

Similarly, looking to FIG. 3, another popular probe configuration is revealed at 34. Probe 34 includes a base 36 which is, for example, stud mounted into the input of transducers as at 24 and further incorporates a conically shaped head 38 having typically a 60° cone angularity with a slightly rounded tip. The probe 28 as well as probe 34 are used in the same manner, the operator holding tips or contact points 32 or 38 firmly against the vibratory surface to be evaluated generally in either a horizontal or vertical orientation. These probes have been seen to restrict the flat or practical frequency response range of the devices, for example, to levels below a desired 1,000 Hz outer value. This desired range has been achieved with the flat face, articulated probe structure shown in perspective in FIG. 4 at 40. Probe 40 is characterized in a tip region 42 with a substantially flat contact surface 44 having a diameter, for example, of ¼ inch or a contact surface area of about 0.2 square inches. The tip portion 42 is coupled through an articulated vibration transfer structure 46 to a base or vibration transfer rod 48, the rearward surface 50 of which may be stud mounted to a transducer such as an accelerometer or the like.

Figure 4:
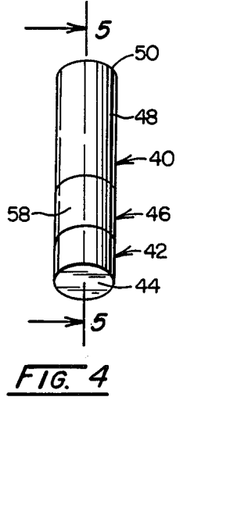
FIG. 4 is a perspective view of a probe according to the invention.
Figure 5:
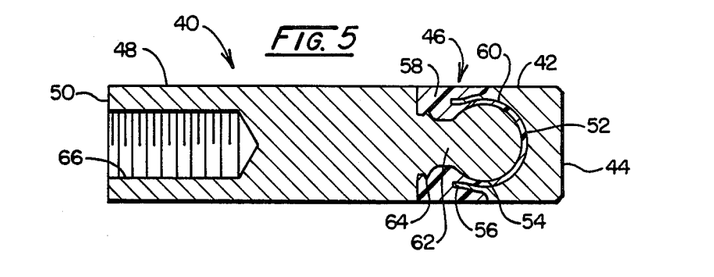
FIG. 5 is a sectional view of the probe of FIG. 4 taken through the plane 5—5 shown therein.

Looking additionally to FIG. 5, the tip portion 42 of probe 40 is seen to be shaped having a concave, curved or hemispherically shaped vibration transfer surface 52 spaced from its contact surface 44. The surface 52 conforms with and is in intimate contact with a curved vibration receiving surface 54 which is seen to be spherically shaped and thus, the combination of surfaces 52 and 54 are structured in the manner of a ball and socket joint. The tip portion 42 is crimped or the like as at 56 to trap the spherically shaped vibration receiving surface 54 within the vibration transfer surface 52. Positioned intermediate the surfaces 52 and 54 is a very thin, conformal lubricant or couplant such as polytetrafluoroethylene (e.g. Teflon), silicon grease the like. Additionally, for the protection of the resultant articulated joints, an elastomeric sheath 58 formed, for example of urethane rubber, surmounts the articulated union 46. This thin conformal layer or lubricant 60 serves to improve the surface-to-surface contact, avoiding any point-like contacts of vibration transfer between surfaces 52 and 54. The spherical vibration receiving surface 54 is seen to be supported upon a neck 62 which, in turn, is supported from the earlier-noted base or vibrationn transfer rod 48. Neck 62 serves to aid in retaining the elastomeric sheath 58 in position against the transfer neck 62-transfer rod 48 assemblage. Finally, a tapped bore 66 provides for conventional stud-mounting of the probe 40 onto a transducer.

Tests were carried out to examine the frequency response characteristics of an accelerometer-probe arrangement employing a probe structured according to the teaching of the invention as represented by the probe structure 40 shown in FIGS. 4 and 5. Additionally, corresponding probe structures as 28 and 34 shown respectively in FIGS. 2 and 3, were tested under the same criteria. All metallic portions of the probes were formed of stainless steel, each probe had a tip to base length of 1 7/16 inches and a diameter of ¼ inch. The radius of the probe 28 at tip 32 was 1½ inch, while the slope of the cone 38 tip of probe 34 was 60°. Surface 44 of the probe represented at 40 was flat and nominally of ¼ inch diameter. Each of the probes in testing was attached to a Model 970 Accelerometer marketed by IRD Mechanalysis, Inc., of Columbus, Ohio. The probes were hand-held upon the test vibratory surface of an electro-dynamic vibration machine identified as a Model 106A of the 100 series shakers produced and marketed by Unholtz-Dickie Corporation of Hamden, Connecticut. With such test devices, the force deriving test vibratory surface motion is produced electrodynamically by the interaction between a current flow in a driver coil and an intense magnetic field disposed across the coil. The Model 970 Accelerometer with select probe attached was hand-held in a vertical orientation upon the test vibratory surface or table of the vibration test equipment. The output of the accelerometer during testing was conventionally processed and applied to a semi-log chart plotting frequency against output deviation in percentage. In the latter regard, the deviation percentage is the percentage of the response observed at a frequency of 100 Hz, a criteria which has been established as a reference. In general, the natural frequency resonance of the Model 970 Accelerometer employed is typically observed at about 30,000 Hz where the device is stud mounted or permanently mounted upon the vibratory surface to be evaluated.

Figure 6:
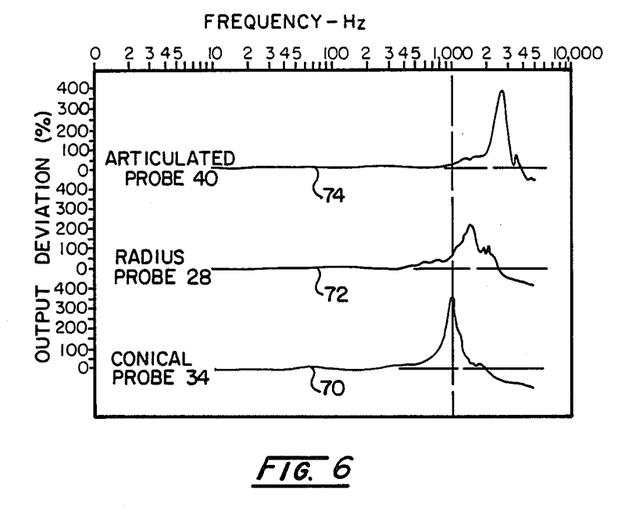
FIG. 6 is a graph showing, in semi-log fashion, frequency response characteristics for the probe structure shown in FIGS. 3–5.

Looking to FIG. 6, experimental results employing the noted vibration test equipment operating with a 1 g shake amplitude and providing for a sweep of frequency from 100 through 5,000 Hz over an interval of three minutes are revealed. In the figure, frequency is plotted in log fashion, while the output deviation is plotted in increments of 25% deviation per division. Results utilizing the conical probe as described at 34 are shown at curve 70. This curve reveals that resonance characteristics of the assemblage with the conical probe 34 commence to the extent of about a 25 percent deviation at less than 600 Hz. The resonance then increased to peak Q values between 900 and 1,000 Hz. In the latter regard, Q typically is considered in accordance with the relation:

$Q = \frac{1}{2}\epsilon$, where $\epsilon = B/2\ K_s M$, where: B is a damping coefficient (F/(1/t)), $K_s$ is a spring constant, and M = mass.

Curve 70, shows that for a desired flat frequency response through 1,000 Hz, the conical probe tended to develop local resonances rendering utilization of a transducer with such a typical probe for hand-held purposes generally unsatisfactory for the noted 1,000 Hz criteria range.

Curve 72 shows corresponding results employing a radius probe as described at 28. Here, again, local resonances appeared to develop representing a 50 to 75 percent deviation at the 1,000 Hz level, an arrangement generally indicating the development of localized resonances and providing a response characteristic not meeting the desired range to 1,000 Hz for hand-held devices.

Curve 74 shows the performance of the same accelerometer with the articulated probe 40 of the invention. Here, deviation less than about 25% is witnessed at the 1,000 Hz range and higher Q characteristics are not observed until the probe is excited beyond 2,000 Hz.

Figure 7:
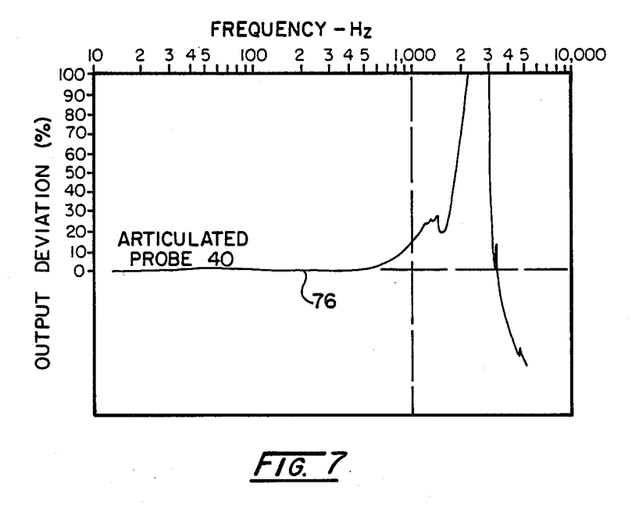
FIG. 7 is a frequency response chart prepared under an enhanced vertical scale criteria in semi-log fashion for the probe structure of FIG. 3.

Referring to FIG. 7, the plotted results of a test with the same vibration test equipment but employing at 2 g amplitude vibration over a 2.8 minute sweep from 100 through 5,000 Hz is revealed. The plotted output is at a higher scale of 2.5% per division and shows that the articulated probe as at 40 of the invention performs showing a deviation of about 12½% at the noted maximum value of frequency of 1,000 Hz. This performance is deemed acceptable for the noted hand-held metering purposes.

Figure 8:
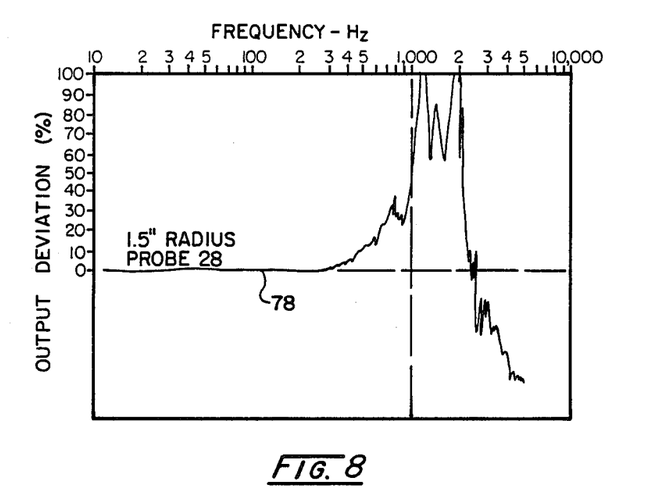
FIG. 8 is a frequency response chart for the probe of FIG. 4 recorded at an enhanced vertical scale.

Looking to FIG. 8, a plot carried out using the same test procedures only with a probe structured as above-described at 28 is revealed. The curve 78 shows that the performance of the assemblage using the 1.5 in. radius tip is unacceptable, local resonances being developed at unacceptable levels between about 500 and 1,000 Hz.

Figure 9:
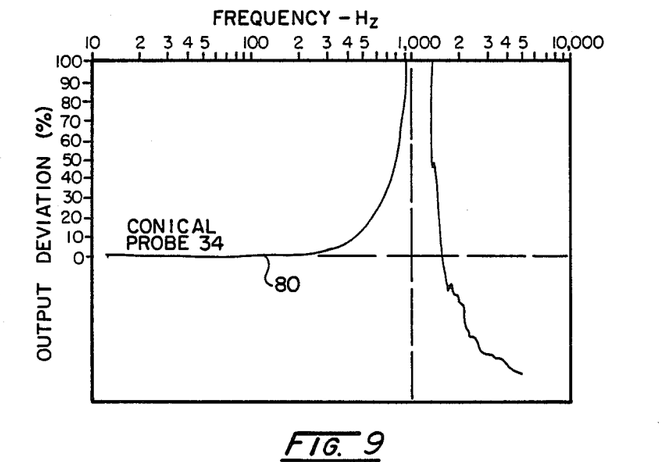
FIG. 9 is a frequency response chart for the probe shown in FIG. 5 taken at an enhanced vertical scale.

Referring to FIG. 9, corresponding tests carried out in the manner of those tests developing curve 76 and 78 but for the conically shaped probe as at 34 are revealed by curve 80. The curve shows a development of resonance characteristics as early as about 500 Hz in the noted sweep and represents generally unsatisfactory frequency response performance.

Figure 10:
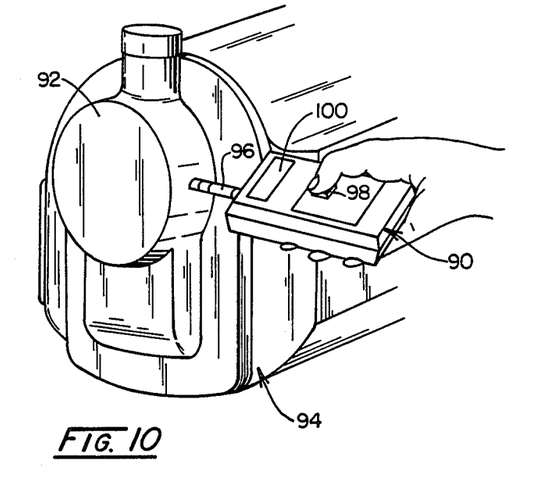
FIG. 10 is a partial perspective view showing a hand-held meter employing the probe assembly of the invention.

The articulated probe assemblage of the invention is ideally suited to the development of the hand-held meter which, when employing an accelerometer form of transducer can be fabricated in highly desirable, very compact size. Looking to FIG. 10, such a meter is revealed at 90 being hand-held in a horizontal orientation against the bearing housing 92 of a machine 94. To operate the meter, the operator positions it so that its integrally coupled articulated probe 96 is positioned and held against the vibratory surface to be evaluated. The operator then simply depresses a switch 98 and observes the vibration parameter readout at, for example, an LCD display 100. For the meter at hand, a velocity vibration parameter is employed for the readout which is developed by integrating the accelerometer output signals. Generally, the utilization of the parameter, vibration velocity is a long accepted practice in the industry, particularly where hand-held meters are employed.

Figure 11:
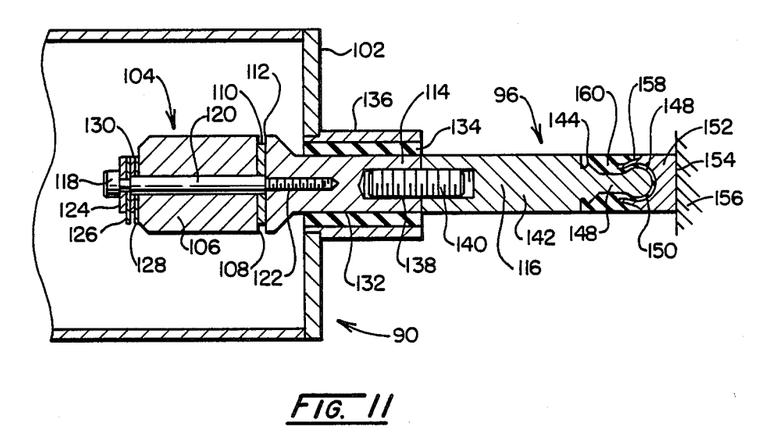
FIG. 11 is a partial top sectional view of the hand-held meter shown in FIG. 10 taken through the plane 11—11 of FIG. 12.
Figure 12:
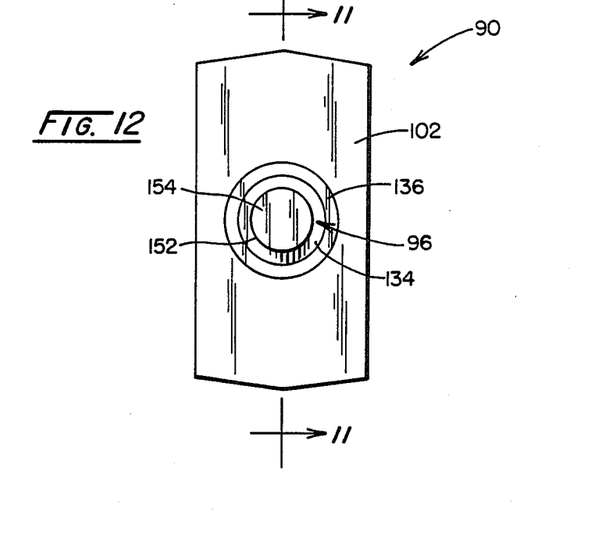
FIG. 12 is a partial side view of the meter of FIG. 11.

Looking to FIG. 11, a partial sectional view of the hand-held meter 90 is revealed showing the structure of the accelerometer and associated articulated probe. In the figure, the housing of meter 90 is represented at 102 which supports an accelerometer type transducer represented generally at 104. Conversion components of accelerometer 104 include a predetermined mass 106, one flat surface of which at 108 is positioned against the piezoelectric crystal 110. The opposite face of crystal 110 is positioned against the face 112 of a generally cylindrically shaped pedestal 114 functioning as a probe vibration transfer rod which is seen to be coaxial with the central axis 116 of the transducer-probe assemblage. Mass 106, piezoelectrical crystal 110, and pedestal 114 are seen to be mechanically coupled together by an elongate machine screw 118 which extends through a central bore within mass 106 in electrical isolation therefrom in consequence of an insulated sheath 120 positioned therebetween. The screw 118 is threadably engaged within a tapped bore 122 formed within pedestal 114 and functions to provide an electrical path from that face of piezoelectric crystal 110 in engagement with pedestal base 112 and a washer form of electrical contact 124 located outwardly from mass 106. Immediately adjacent to washer 104 and in electrical contact therewith is a circuit contact or electrode 126. Correspondingly, the opposite face of crystal 110 is in electrical contact with the face 108 of stainless steel mass 106. Thus, mass 106 provides an electrical path to an electrode 128. Electrodes 126 and 128 are electrically separated by a Mica or ceramic washer 130. The cylindrical stem portion 132 of pedestal 114 extends through a cylindrical transducer shock mounting 134 which is formed, for example, of urethane rubber. Mounting 134 is shown formed within an aluminum cylindrical support cowling 136 attached, in turn, to the forward face of housing 102. Shock mounting 134 isolates the vibratory effects of the probe components from the electronics and the like associated with the meter function within housing 102. Cylindrical stem portion 132 of the pedestal 114 is centrally bored and tapped at 138 to receive a threaded stud 140 arranged coaxially with central axis 116. Stud 140, in turn, threadably engages the probe vibration transfer rod or probe base or cylindrical probe base 142. Rod or base 142 is shown, as before, extending to the concave annular ring 144, thence to a neck portion 146 which, in turn, serves to support a curved vibration receiving surface 148 here formed as a spherical surface. Surface 148 is positioned for intimate slideable contact with a correspondingly curved vibration transfer surface 150 of probe tip portion 152. Spaced from the surface 150 is a circular flat contact surface 154 shown in contact with a vibratory surface 156. Spherical vibration receiving surface 148 is trapped within the curved vibration transfer surface 150 by a crimped region 158 of the tip 152. Intermediate the surfaces 148 and 150 is a thin lubricant layer 158 which may be formed of Teflon or silicon grease. As before, the resultant ball and socket joint is protected by elastomeric sheath 160 protecting the articulated assembly. As before, the layer 158 in sheath 160 may be formed of a silicon rubber, Teflon, or the like.

Figure 13:
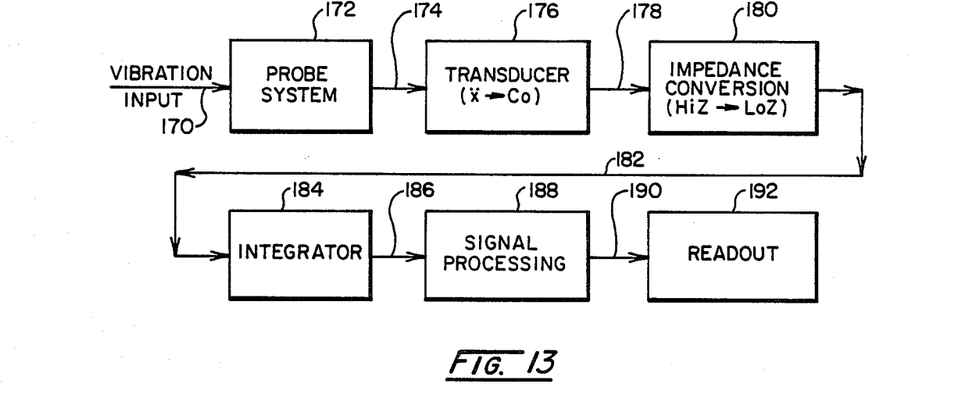
FIG. 13 is a block diagrammatic representation of the probe system and related control components employed with the meter of FIG. 10.

Looking to FIG. 13, a block diagrammatic representation of the features of the meter 90 is revealed. Vibration input from a vibratory surface to the meter is represented at arrow 170. This vibration input is directed to a probe system as represented at block 172. The probe system includes the components of the probe including tip 152, vibration transfer rod or probe base 142, and the pedestal 114 providing vibratory input to the transducer-accelerometer 104. The output of this probe system then is represented at arrow 174 leading to the transducer function herein represented at block 176 and provided as the noted accelerometer 104. The accelerometer 104 provides an output charge categorized-signal from piezoelectric crystal 110 and having the attributes of the vibrationally applied force and the value of mass 106 as represented at arrow 178. This charge-characterized output then is directed through an impedance conversion stage altering its value from a high impedance to low impedance as represented at block 180. In effect, the charge is pre-amplified to provide an output signal as represented at arrow 182. This output signal, representing vibrational acceleration then is electrically integrated as repesented at block 184 to provide a velocity characterized vibration output signal as represented at arrow 186. This signal then is processed as desired annd represented at block 188 for, for example, developing an LCD digital readout for the meter as described in conjunction with FIG. 10 at 100. The display is shown receiving the output of the signal processing function at block 188 via line 190 and, is shown as a readout 192.

Since certain changes may be made in the above-described apparatus without departing from the scope of the invention herein involved, it is intended that all matter contained in the description thereof or shown in the accompanying drawings shall be interpreted as illustrative and not in a limiting sense.

We claim:

1. In a hand-held vibration sensor of a variety in which a sampling probe is manually positioned against a vibratory surface for effecting the transmission of vibratory phenomena, which phenomena are associated with said surface, to transducer conversion components from along a given axis for deriving select vibration parameter signals corresponding therewith, the improved probe comprising:

a probe vibration transfer rod having one end connectable with said conversion components and extending along said axis to a curved vibration receiving surface;

probe tip means having a substantially flat contact surface for manually positioning in abutting engagement with said vibratory surface and a curved vibration transfer surface spaced therefrom conforming with and intimately contacting said vibration receiving surface over a substantial surface area in slideably movable nesting relationship for transferring vibration phenomena experienced at said vibratory surface to said probe vibration transfer rod without substantial generation of localized resonances between said contact surface and said vibratory surface.

2. The improved probe of claim 1 in which said curved transfer surface and said curved vibration receiving surface are configured having substantially mutually contacting spherical areas for effecting said vibration phenomena transfer.

3. The improved probe of claim 1 including a thin, lubricant layer intermediate said vibration receiving surface and said transfer surface.

4. The improved probe of claim 3 in which said lubricant layer is silicon grease.

5. The improved probe of claim 3 in which said lubricant layer is polytetrafluoroethylene.

6. The improved probe of claim 1 in which said curved transfer surface and said curved vibration receiving surface are configurd as a ball and socket joint.

7. The improved probe of claim 6 in which said ball and socket joint is enclosed by a sheath of elastomeric polymeric filler material.

8. The probe of claim 7 including a thin, complaint, polymeric layer intermediate said vibration receiving surface and said transfer surface.

9. A hand-held meter for evaluating the vibration of a vibratory surface, comprising:

a hand-held housing;

transducer means mounted within said housing and including conversion components responsive to vibration applied thereto along a given axis for deriving vibration signals corresponding therewith;

probe vibration transfer rod means aligned with said axis and extending from said housing to an end located externally of said housing for applying vibration to said transducer means conversion components;

shock mounting means formed of an elastomeric damping material for mounting said vibration transfer rod means to said housing and damping vibration otherwise asserted from said rod means to said housing;

means defining a curved vibration receiving surface located at said probe vibration transfer rod means end;

probe tip means having a substantially flat contact surface for positioning in abutting contact with said vibratory surface and a curved vibration transfer surface spaced therefrom conforming with and intimately contacting said vibration receiving surface over a substantial surface area in slideably movable nesting relationship for transferring vibration experienced at said vibratory surface to said probe vibration transfer rod means;

signal treatment means within said housing responsive to said vibration signals for deriving vibration parameter signals; and readout means mounted upon said housing, responsive to said vibration parameter signals for providing a perceptible readout corresponding therewith.

10. The hand-held meter of claim 9 which:

said transducer means is an accelerometer and said conversion components include a predetermined mass and a piezoelectric crystal coupled for deriving said vibration signals in response to vibration transferred thereto from said vibration transfer rod means; and said signal treatment means includes an integrator stage for deriving said vibration parameter signals as vibration velocity signals.

11. The hand-held meter of claim 10 including a thin, lubricant layer intermediate said vibration receiving surface and said transfer surface.

12. The hand-held meter of claim 9 in which said curved transfer surface and said curved receiving surface are hemispherical and mutually configured as a ball and socket joint.

13. The hand-held meter of claim 12 which said ball and socket joint is enclosed by a sheath of elastomeric polymeric filler material.

14. The hand-held meter of claim 12 including a thin, compliant, polymeric layer intermediate said vibration receiving surface and said transfer surface.

15. The hand-held meter of claim 12 in which said probe tip means flat contact surface has an area of about 0.2 square inch.

16. An accelerometer assembly for evaluating the vibration characteristics of a vibratory surface, comprising:

a housing;

an accelerometer mounted within said housing, having conversion means including a predetermined mass and a piezoelectric crystal coupled for response to vibration applied along a given axis for deriving vibration signals corresponding therewith;

vibration transfer rod means aligned with said axis, connected with said conversion means and extending from said housing to an end, for applying vibration to said accelerometer conversion means;

means defining a curved vibration receiving surface located at said vibration transfer rod means end; and probe tip means having a substantially flat contact surface for manually positioning in abutting contact with said vibratory surface and a curved vibration transfer surface spaced therefrom conforming with and intimately contacting said vibration receiving surface over a substantial parallel surface area in slideably movable nesting relationship for transferring vibrationn experienced at said vibratory surface to said vibration transfer rod means.

17. The accelerometer assembly of claim 16 including a thin, lubricant layer intermediate said vibration receiving surface and said transfer surface.

18. The accelerometer of claim 16 in which said curved transfer surface and said curved receiving surface are hemispherical and mutually configured as a ball and socket joint.

19. The accelerometer of claim 18 in which said ball and socket joint is enclosed by a sheath of elastomeric polymeric filler material.

20. The accelerometer assembly of claim 18 including a thin, lubricant layer intermediate said vibration receiving surface and said transfer surface.

21. The accelerometer assembly of claim 16 in which said probe tip means flat contact surface has an area of about 0.2 square inch.

* * * * *